(12) United States Patent
Ratner et al.

(10) Patent No.: US 7,186,396 B2
(45) Date of Patent: Mar. 6, 2007

(54) METHOD FOR HYDROGEN STORAGE AND DELIVERY

(75) Inventors: Buddy D. Ratner, Seattle, WA (US); Esmaeel Naeemi, Lynnwood, WA (US)

(73) Assignee: Asemblon, Inc., Seattle, WA (US)

( * ) Notice: Subject to any disclaimer, the term of this patent is extended or adjusted under 35 U.S.C. 154(b) by 8 days.

(21) Appl. No.: 10/997,368

(22) Filed: Nov. 23, 2004

(65) Prior Publication Data

US 2005/0142401 A1 Jun. 30, 2005

Related U.S. Application Data

(60) Provisional application No. 60/525,422, filed on Nov. 26, 2003.

(51) Int. Cl.
*C01B 3/02* (2006.01)
(52) U.S. Cl. .......................... 423/648.1; 48/61
(58) Field of Classification Search ............ 423/648.1, 423/650, 651, 652, 653, 654
See application file for complete search history.

(56) References Cited

U.S. PATENT DOCUMENTS

| 6,482,997 | B2 | 11/2002 | Petit-Clair et al. | 585/250 |
|---|---|---|---|---|
| 6,607,707 | B2 * | 8/2003 | Reichman et al. | 423/648.1 |
| 6,964,757 | B2 * | 11/2005 | Cortright et al. | 423/648.1 |
| 6,964,758 | B2 * | 11/2005 | Cortright et al. | 423/648.1 |
| 2004/0137288 | A1 * | 7/2004 | Morgenstern | 429/17 |

OTHER PUBLICATIONS

*Efficient Evolution of hydrogen from liquid cycloalkanes over Pt-containing catalysts supported on active carbons under "wet-dry multiphase conditions"* Nobuko Kariya et al. Catalysis Research Center, Hokkaido University Feb. 2002.

" *First Examples of Homogenous Hydrogenolysis of Thiophene to 1-Butanethiolate and Ethylthioketene Ligands; Synthesis and reactivity of $(\eta_4\text{-}C_4H_5S)ReH_2(PPh_3)_2$*," Glen P. Rosini et al. Department of Chemistry, University of Rochester, Rochester, New York Jun. 1992.

"*Cleavage and Formation of C-S and C-N Bnds in Heterocyclic Compounds by Homogenous Transition Metal Complexes*" William D. Jones et al. Department of Chemistry, University of Rochester, Rochester, New York; Annual Progress Report, National Science Foundation, Grant CHE-0414325 Jul. 2004 to Jun. 2005.

"*Studies of Carbon-Sulfur Bond Cleavage by Homogenous Transition Metal Complexes*" William P. Jones, P.I. Department of Chemistry, University of Rochester, Rochester, New York; Annual Progress Report, National Science Foundation, Grant CHE-9816365 Feb. 1999 to Jan. 2000.

(Continued)

*Primary Examiner*—Wayne A. Langel
(74) *Attorney, Agent, or Firm*—DLA Piper US LLP

(57) ABSTRACT

The present invention relates to hydrogen production for the generation of energy. The invention describes methods, devices and assemblies involving hydrogen production including reacting hydrogen producing compounds, such as organothiol compounds, with a reactive metal substrate to produce hydrogen gas and utilizing the hydrogen gas to generate energy. The present invention further describes regenerating spent compound to a form suitable for hydrogen production by reacting the spent compound with hydrogen. Hydrogen storage and production, as described herein, is useful for producing hydrogen for energy production in hydrogen consuming devices, such as combustible engines and fuel cells, for example, as located on a hydrogen powered vehicle.

23 Claims, 5 Drawing Sheets

OTHER PUBLICATIONS

"*Studies of Carbon-Sulfur Bond Cleavage by Homogenous Transition Metal Complexes*" William P. Jones, P.I. Department of Chemistry, University of Rochester, Rochester, New York; Annual Progress Report, National Science Foundation, Grant CHE-9816365 Feb. 2000 to Jan. 2001.

"*Studies of Carbon-Sulfur Bond Cleavage by Homogenous Transition Metal Complexes:*" William P. Jones, P.I. Department of Chemistry, University of Rochester, Rochester, New York; Annual Progress Report, National Science Foundation, Grant CHE-9421727 Jan. 1995 to Jan. 1996 (1 of 3).

"*Studies of Carbon-Sulfur Bond Cleavage by Homogenous Transition Metal Complexes:*" William P. Jones, P.I. Department of Chemistry, University of Rochester, Rochester, New York; Annual Progress Report, National Science Foundation, Grant CHE-9421727 Jan. 1996 to Jan. 1997 (2 of 3).

"*Studies of Carbon-Sulfur Bond Cleavage by Homogenous Transition Metal Complexes:*" William P. Jones, P.I. Department of Chemistry, University of Rochester, Rochester, New York; Annual Progress Report, National Science Foundation, Grant CHE-9421727 Jan. 1997 to Jan. 1998 (3 of 3).

International Search Report and Written Opinion dated Dec. 13, 2005 for International application No. PCT/US04/39644 filed on Nov. 24, 2004.

* cited by examiner

Figure 4
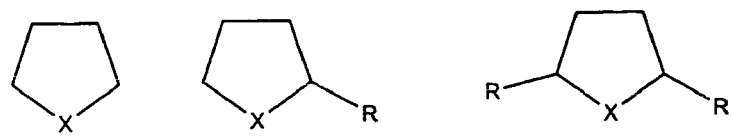
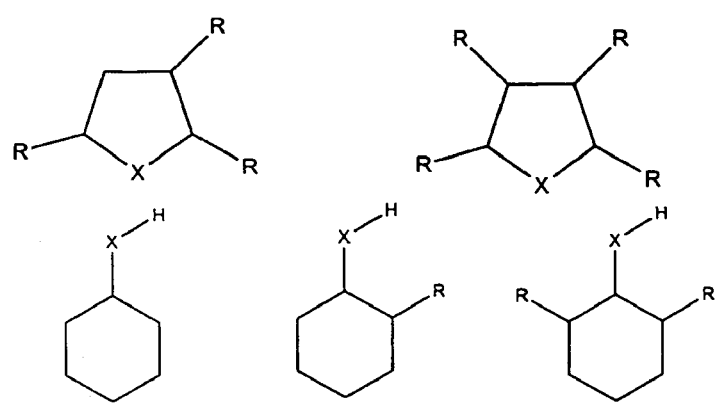
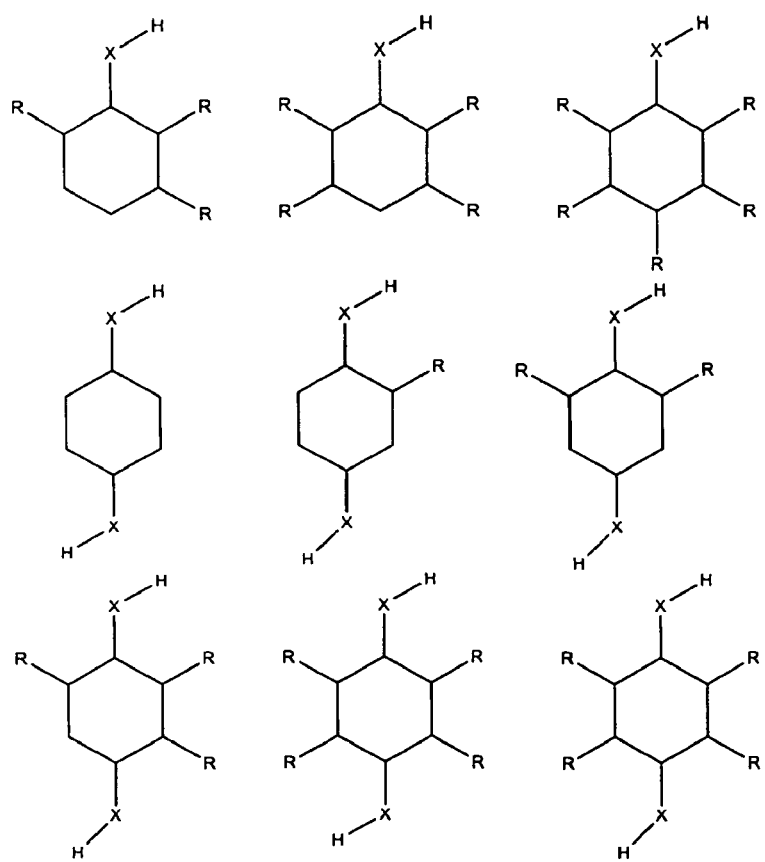

METHOD FOR HYDROGEN STORAGE AND DELIVERY

CROSS REFERENCE TO RELATED APPLICATION

This application claims the benefit of priority under 35 U.S.C. § 119(e) of U.S. Ser. No. 60/525,422, filed Nov. 26, 2003, the entire content of which is incorporated herein by reference.

BACKGROUND OF THE INVENTION

1. Field of the Invention

The invention relates generally to hydrogen storage, production, and utilization for generating energy and more specifically to methods of producing hydrogen from re-usable hydrogen producing compounds and methods of regenerating spent compounds to a form suitable for hydrogen production, as well as devices and assemblies for producing hydrogen.

2. Background Information

A "hydrogen economy" is a an economy in which a substantial portion of energy generation occurs by use of hydrogen as a fuel. A hydrogen fuel based economy is particularly attractive and desirable due to the promise of a plentiful and environmentally clean energy source. Fuel cell technology, for example, continues to advance and offers the potential to convert hydrogen and oxygen (e.g., air) to energy, such as electricity, in an efficient manner, emitting only water. Changing to a more hydrogen fuel based system, however, requires a transition from the worldwide petrochemical production and delivery infrastructure and a conversion to a hydrogen fuel based system.

Sources for hydrogen storage and production are continuously being discovered and technologies advanced, and the cost of producing hydrogen fuel is continuously declining. Effective utilization of these technological advances and a transition to more hydrogen fuel based systems, however, is severely limited by the currently available sources of hydrogen storage and production. Current technologies are significantly lacking, for example, with regard to efficient and practical means for storage and delivery of hydrogen to locations where hydrogen consumption is desired.

Currently available methods of storing and delivering hydrogen fuel include, for example, compressed hydrogen, liquefied hydrogen, physical metal hydride storage, chemical hydride storage, nanotube storage, and others. Compressed and liquefied storage are primarily limited by the energy intensive, and therefore costly, methods needed to compress the hydrogen, as well as bulky and heavy tanks required to store the compressed/liquefied hydrogen, which can pose a severe explosive risk when positioned on-board a moving vehicle or automobile. Hydride storage is promising, but current methods are extremely expensive and far too heavy for practical use on-board a vehicle. It is estimated, for example, that a small metal hydride container holding less than 2 grams of hydrogen weighs 230 grams. Accordingly, storing the equivalent of 8 liters or 2 U.S. gallons of gasoline would require a hydride store weighing up to 200 kilograms or 440 pounds, making this type of hydrogen storage impractical, for example, for automobile applications (see, for example, Bossel et. al., April 2003 report: "The Future of the Hydrogen Economy: Bright or Bleak?").

Unfortunately, devices and methods that are inexpensive, but efficient and lightweight, and practical for use on-board hydrogen powered vehicles, have not yet been discovered. Thus, a need exists for methods and devices for lightweight and efficient storage of hydrogen, which are useful for on-demand hydrogen production for energy generation on-board hydrogen powered vehicles.

SUMMARY OF THE INVENTION

The present invention is based, in part, on the discovery that certain compounds are useful for chemically storing hydrogen and can be utilized for producing hydrogen, upon demand, in quantities sufficient for use in generating energy. The current invention further describes regeneration of the spent compound to a hydrogen-rich form that is suitable for hydrogen production and re-use in hydrogen production according to the described methods.

Thus, the present invention relates to a method of generating energy using hydrogen produced by reacting a liquid compound capable of producing hydrogen and having the formula R—XH, with a metal substrate to produce hydrogen gas; and utilizing the hydrogen gas to generate energy. The chemical group denoted as R includes, for example, a moiety selected from an alkyl, heteroalkyl, alkenyl, substituted alkenyl, alkynyl, aryl, heteroaryl, alkoxy, cycloalkyl, heterocyclic, alkylaryl, arylalkyl, arylalkenyl, arylalkynyl, arylene, oxyarylene group, and combinations thereof. Furthermore, X can include sulfur, or oxygen, selenium. Metal substrates suitable for reacting with the liquid compound to produce hydrogen can include, for example, gold, silver, platinum, copper, and mercury, as well as metals treated to remove a surface oxide coating. Metal substrates can include pure metal substrates as well mixtures of metals, such as metal alloys and a polymer coated with metals. The method further includes utilizing the hydrogen gas to generate energy. Utilization of the hydrogen gas can include, for example, consuming the hydrogen gas in a combustible engine, fuel cell, or any other hydrogen consuming device.

The present invention further relates to methods of storing and producing hydrogen for use in generating energy. In one embodiment, the method of storing and producing hydrogen is performed by reacting a liquid compound capable of producing hydrogen and having a formula $R_1$—XH, with a metal substrate to produce hydrogen gas and $R_1$—X bound to the metal substrate and utilizing the hydrogen gas. The group $R_1$ includes, for example, a moiety selected from an alkyl, heteroalkyl, alkenyl, substituted alkenyl, alkynyl, aryl, heteroaryl, alkoxy, cycloalkyl, heterocyclic, alkylaryl, arylalkyl, arylalkenyl, arylalkynyl, arylene, oxyarylene group, and combinations thereof. Furthermore, X can include sulfur, oxygen, or selenium. Metal substrates suitable for reacting the liquid compound to produce hydrogen can include, for example, gold, silver, platinum, copper, and mercury, as well as metals treated to remove a surface oxide coating. Metal substrates can include pure metal substrates as well mixtures of metals, such as metal alloys. Collecting the hydrogen gas can include, for example, consuming the hydrogen gas in a device such as a combustible engine or fuel cell.

The method can further include disassociating the $R_1$—X from the metal substrate to produce a spent compound. A spent compound can include, for example a dimeric compound, such as a compound having a formula $R_1$—X—X—$R_1$. Various methods of disassociating the $R_1$—X compound from the metal substrate are suitable for the methods of the invention, including by application of an energy source to the bound $R_1$—X compound. Disassociating the $R_1$—X compound can include, for example, heating the $R_1$—X compound bound to the metal substrate and/or contacting the $R_1$—X compound bound to the metal substrate with ultraviolet (UV) light, as well as contacting the compound with an electric current.

The present invention is also based, in part, on the ability to regenerate the hydrogen producing capacity of the spent compounds used to produce hydrogen (e.g., dimeric compound). Thus, in one embodiment, the method of storing and producing hydrogen further includes reacting the spent compound with hydrogen to produce a compound having a formula $R_1$—XH, thereby regenerating the spent compound to a form suitable for hydrogen production (e.g., regenerating, from the spent compound, a compound capable of producing hydrogen). Various methods of regenerating hydrogen producing compound from the spent compound are useful in the methods of the invention, including, for example, reacting the spent compound with hydrogen via the process of catalytic hydrogenation. The steps of producing hydrogen for generating energy and the step of regenerating the spent compound can occur at the same location or locations of close proximity. Alternatively, the hydrogen production step and the spent compound regeneration step can occur at different locations. For example, the hydrogen production step can occur in or on-board an automobile, whereas the spent compound regeneration step can occur off-board or separate from the automobile, including, for example, following removal of the spent compound from the automobile. Where the hydrogen production occurs at a stationary unit, such as a building (e.g., home, business, dwelling, etc.), the regeneration can also occur at the building, such as a location within the building and in close proximity to the location within the building of hydrogen production, or can occur at a location different than the building.

According to the methods of the present invention, hydrogen can also be produced by dehydrogenation of a hydrocarbon moiety of a hydrogen producing compound, wherein the dehydrogenation occurs upon reacting the compound with a metal substrate. Thus, in another embodiment of the present invention, a method of storing and producing hydrogen for use in generating energy is performed by reacting a liquid compound capable of producing hydrogen and having a formula of $R_1$—XH, with a metal substrate to produce hydrogen gas and a spent compound. A spent compound can include, for example, a compound having a formula $R_2$—XH, wherein $R_2$ is dehydrogenated relative to $R_1$; $R_3$=X, wherein $R_3$ is dehydrogenated relative to $R_1$; or a combination thereof. According to this embodiment of the present invention, each of $R_1$, $R_2$, and $R_3$ is a moiety independently selected from the group of an alkyl, heteroalkyl, alkenyl, substituted alkenyl, alkynyl, aryl, heteroaryl, alkoxy, cycloalkyl, heterocyclic, alkylaryl, arylalkyl, arylalkenyl, arylalkynyl, arylene, oxyarylene group, and combinations thereof. Furthermore, and X is selected from the group consisting of sulfur, oxygen, and selenium. Similar to above, metal substrates suitable for the methods of the invention include, for example, gold, silver, platinum, copper, and mercury, as well as metals treated to remove a surface oxide coating and can include, for example, pure metal substrates as well mixtures of metals, such as metal alloys.

The liquid compound capable of producing hydrogen according to the methods of the invention is suitable for re-use, in that spent compound is capable of being regenerated to a form suitable for hydrogen production. As such, the current methods further include reacting the spent compound with hydrogen to produce a compound having a formula $R_1$—XH, thereby regenerating, from the spent compound, the compound capable of producing hydrogen. The steps of producing hydrogen and regenerating the spent compound can occur, for example, at locations of close proximity (e.g., within the same device) or at different locations.

The present invention further relates to devices for producing hydrogen for generating energy. In one embodiment, the device includes a storage reservoir adapted to contain a liquid compound capable of producing hydrogen and having a formula R—XH, wherein R is a moiety selected from the group consisting of an alkyl, heteroalkyl, alkenyl, substituted alkenyl, alkynyl, aryl, heteroaryl, alkoxy, cycloalkyl, heterocyclic, alkylaryl, arylalkyl, arylalkenyl, arylalkynyl, arylene, oxyarylene group, and combinations thereof; and X is selected from the group consisting of sulfur, oxygen, and selenium. The device further includes a metal substrate adapted to react with the liquid compound to produce an R—X compound bound to the metal substrate and hydrogen gas.

The device can additionally include an energy source capable of disassociating the R—X compound from the metal substrate to produce a spent compound. A spent compound can include, for example, a dimeric compound, such as a compound having a formula R—X—X—R. The energy source can include, for example, a heat source or a UV light source.

In another embodiment of the present invention, a device for producing hydrogen for generating energy includes a storage reservoir adapted to contain a liquid compound capable of producing hydrogen and having a formula $R_1$—XH; and a metal substrate adapted to react with the liquid compound to produce hydrogen gas and a spent compound. A spent compound can include, for example, a compound having a formula $R_2$—XH, wherein $R_2$ is dehydrogenated relative to $R_1$; $R_3$=X, wherein $R_3$ is dehydrogenated relative to $R_1$; or a combination thereof. Each of $R_1$, $R_2$, and $R_3$ includes a moiety independently selected from the group of an alkyl, heteroalkyl, alkenyl, substituted alkenyl, alkynyl, aryl, heteroaryl, alkoxy, cycloalkyl, heterocyclic, alkylaryl, arylalkyl, arylalkenyl, arylalkynyl, arylene, oxyarylene group, and combinations thereof. Furthermore, X is selected from the group consisting of sulfur, oxygen, and selenium.

Metal substrates suitable for use in a device of the invention include, for example, gold, silver, platinum, copper, mercury, and metals treated to remove a surface oxide coating. Metal substrates can include pure metal substrates as well as metal mixtures or alloys. Metal substrates can further include various forms of metals, including nanoporous metals, such as nanoporous gold. In one embodiment, the compound can include, for example, an organothiol compound.

A device of the present invention can also include a reservoir for storing the spent compound. In one embodiment, the reservoir for storing the spent compound is adapted for removal of the spent compound from the device. The device can additionally include a regeneration chamber adapted to react the spent compound with hydrogen received from a source external to the device to produce a compound having a formula R—XH, thereby regenerating hydrogen producing compound from the spent compound. The device of the invention is amenable to utilizing the hydrogen gas to generate energy. Utilizing the hydrogen gas to generate energy can include, for example, consuming the hydrogen gas in a hydrogen consuming device, such as a hydrogen combustion engine or a fuel cell. As such, the current invention additionally relates to an automobile having a hydrogen consuming device and a device of the present invention for producing hydrogen.

The present invention further relates to methods of regenerating hydrogen producing compound from a spent compound. Such a method includes receiving a spent compound from a device for producing hydrogen for generating energy, and reacting the spent compound with hydrogen to produce a compound having a formula R—XH, thereby regenerating hydrogen producing compound from a spent compound.

The present invention also relates to assemblies for producing and utilizing hydrogen. In one embodiment, an assembly of the invention includes a first unit for generating hydrogen and a second unit for utilizing hydrogen to generate energy, wherein the second unit is adapted to accept hydrogen from the first unit. The first unit includes a storage reservoir adapted to contain a liquid compound capable of producing hydrogen and having a formula R—XH, wherein R is a moiety selected from the group consisting of an alkyl, heteroalkyl, alkenyl, substituted alkenyl, alkynyl, aryl, heteroaryl, alkoxy, cycloalkyl, heterocyclic, alkylaryl, arylalkyl, arylalkenyl, arylalkynyl, arylene, oxyarylene group, and combinations thereof; and X is selected from the group consisting of sulfur, oxygen, and selenium. The first unit further includes a metal substrate adapted to react with the liquid compound to produce an R—X compound bound to the metal substrate and hydrogen gas. The second unit can include, for example, a hydrogen consuming device, such as a hydrogen combustion engine or a fuel cell. In one embodiment, an assembly of the present invention can be contained within an automobile.

An assembly of the invention can additionally include an energy source capable of disassociating R—X from the metal substrate to produce a spent compound (e.g., a dimeric compound having a formula R—X—X—R). The energy source can include, for example, a heat source or a UV light source.

In another embodiment of the invention, an assembly includes a first unit for generating hydrogen and a second unit for utilizing hydrogen to generate energy, wherein the second unit is adapted to accept hydrogen from the first unit. The first unit includes a storage reservoir adapted to contain a liquid compound capable of producing hydrogen and having a formula $R_1$—XH; and a metal substrate adapted to react with the liquid compound to produce hydrogen gas and a spent compound. A spent compound can include, for example, a compound having a formula $R_2$—XH, wherein $R_2$ is dehydrogenated relative to $R_1$; $R_3$=X, wherein $R_3$ is dehydrogenated relative to $R_1$; or a combination thereof. Each of $R_1$, $R_2$, and $R_3$ includes a moiety independently selected from the group of an alkyl, heteroalkyl, alkenyl, substituted alkenyl, alkynyl, aryl, heteroaryl, alkoxy, cycloalkyl, heterocyclic, alkylaryl, arylalkyl, arylalkenyl, arylalkynyl, arylene, oxyarylene group, and combinations thereof. Furthermore, X is selected from the group consisting of sulfur, oxygen, and selenium. The second unit can include, for example, a hydrogen consuming device, such as a hydrogen combustion engine or a fuel cell.

Metal substrates suitable for use in an assembly of the invention include, for example, gold, silver, platinum, copper, mercury, and metals treated to remove a surface oxide coating. Metal substrates can include pure metal substrates as well as metal alloys. Reactive metal substrates can further include various forms of metals, including nanoporous metals, such as nanoporous gold. In one embodiment, the hydrogen producing compound can include, for example, an organothiol compound.

An assembly can also include a reservoir for storing the spent compound. In one embodiment, the reservoir for storing the spent compound is adapted for removal of the spent compound from the device. The assembly can additionally include a regeneration chamber adapted to react the spent compound with hydrogen received from a source external to the device to produce a compound having a formula R—XH, thereby regenerating hydrogen producing compound from the spent compound.

BRIEF DESCRIPTION OF THE DRAWINGS

FIG. 4 illustrates examples of compounds suitable for use according to the present invention.

DETAILED DESCRIPTION OF THE INVENTION

The present invention derives from the discovery that certain hydrogen producing compounds are useful for chemically storing hydrogen and for producing hydrogen, upon demand, for the purposes of generating energy. Hydrogen producing compounds, according to the invention, can be reacted with metal substrates to produce hydrogen gas. The compound can be in liquid form and can be used and distributed, for example, according to conventional means of automobile fuel use and distribution (e.g., filling stations, fuel delivery trucks, pipelines, etc.). The spent compound can be reprocessed and regenerated, by hydrogenation of the spent compound, to produce a compound capable of producing hydrogen and suitable for further use in hydrogen production according to the present invention. Thus, the current invention further describes regenerating a hydrogen-rich form suitable for hydrogen production (e.g., a hydrogen producing compound) from the spent compound, and re-use of the regenerated compound in hydrogen production according to the described methods.

Figure 1:
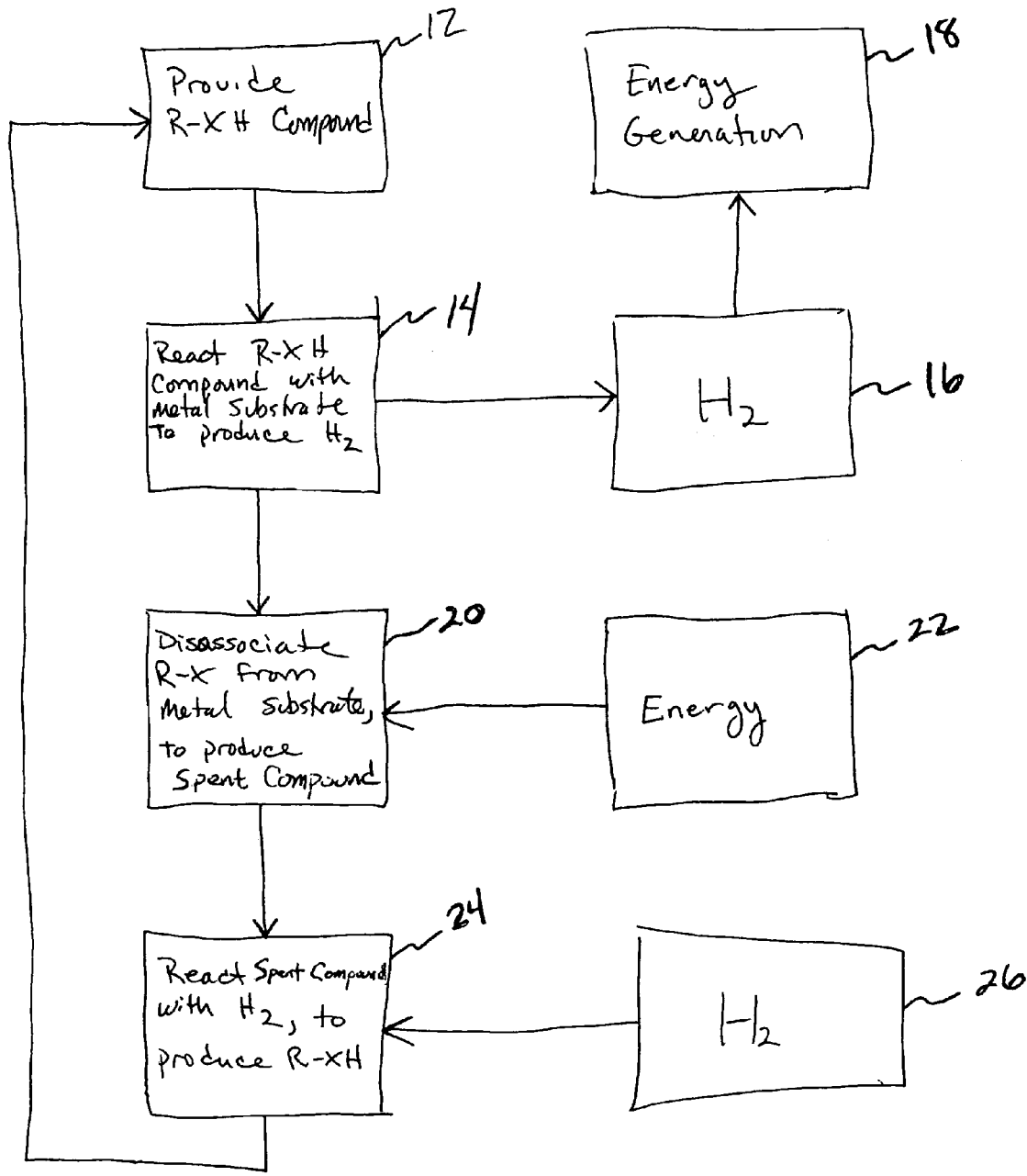
FIG. 1 shows a flowchart diagram of hydrogen production and regeneration of hydrogen producing compound from spent compound according to an embodiment of the present invention.

Referring to FIG. 1, a flowchart diagram 10 of hydrogen production and regeneration of hydrogen producing compound from spent compound, according to an embodiment of the present invention, is shown. Hydrogen production for energy generation begins by providing a hydrogen producing compound in step 12. A hydrogen producing compound of the invention has a formula R—XH, where R is an organic moiety and X includes sulfur, oxygen, or selenium. The compound is reacted with a metal substrate to produce hydrogen gas in step 14. In addition to producing hydrogen gas, reacting the compound with the metal substrate further produces spent compound and/or R—X compound bound to the metal substrate. The hydrogen gas can be collected 16, for example, and used for generating energy in step 18. Following reaction of the hydrogen producing compound with the metal substrate in step 14, any compound bound to the metal substrate can be disassociated from the metal substrate in step 20. Disassociation of the R—X compound bound to the metal substrate in step 20 can be accomplished by an input of energy from an energy source 22. A disassociated spent compound (e.g., a dimeric compound having a formula R—X—X—R) is produced from the input of energy 22 and disassociation of the bound R—X compound from the metal substrate in step 20. Spent compound can be collected, for example, and regenerated (e.g., hydrogenated) to a form suitable for the production of hydrogen gas. Regeneration of spent compound to a form suitable for hydrogen production is accomplished by reacting the spent compound with hydrogen to produce a compound having a formula R—XH in step 24, thereby regenerating hydrogen producing compound from spent compound. Hydrogen 26 utilized for regenerating the hydrogen producing compound from the spent compound can be obtained by any means of hydrogen generation, including, for example, conventional methods of production.

Accordingly, the present invention relates to generating energy through utilization of hydrogen produced according to the described methods. In one embodiment, a method of generating energy is performed by reacting a liquid compound capable of producing hydrogen, such as a compound having a formula R—XH, with a metal substrate to produce hydrogen gas and spent compound and/or an R—X compound bound to the metal substrate. The hydrogen gas produced by the described methods can further be utilized to generate energy including, for example, by utilization in a hydrogen consuming device, such as a combustible engine or a fuel cell.

The present invention is based, in part, on the discovery that compounds commonly used in the art of self-assembled monolayers (SAMs) are capable of efficiently reacting with metal substrates to produce significant quantities of hydrogen gas, and that compounds produced as by-products of the reaction (e.g., spent compounds) can further be reacted with hydrogen and hydrogenated, thereby regenerating the spent compounds to a form suitable for hydrogen production. Surprisingly, compounds that are commonly used in forming SAMs are also capable of efficiently producing hydrogen in quantities sufficient for use in generating energy, including, for example, in fuel cells or hydrogen combustion engines (Examples 1–2).

Compounds, such as organothiol compounds, are well known in the art of SAMs for their ability to spontaneously react with certain metallic substrates, forming a an organothiolate compound bound to the metal surface. SAMs are generally depicted as an assembly of organized, closely packed molecules. Self-assembled monolayers formed, for example, by the chemisorption of organic molecules on metallic surfaces (e.g., gold) are well characterized synthetic organic monolayers. See, Ulman, *An Introductin to Ultrathin Organic Films: From Langmuir-Blodgett to Self-Assembly*, Academic Press, San Diego, 1991; Dubois et al., Annu. Rev. Phys. Chem., 43: 437 (1992). These monolayers form spontaneously upon contacting an organothiol compound with a metal substrate as a result of chemisorption of sulfur on the textured surface of the metal substrates. The molecules self-organize into a commensurate lattice on the surface of the metal substrate. See, Porter, J. Am. Chem. Soc., 109: 3559 (1987); Camillone III, et al., Chem. Phys., 98: 3503 (1993); Fenter et al., Science, 266: 1216 (1994); 20; Chidsey et al., Langmuir, 6: 682 (1990); Sun et al., Thin Solid Films, 242: 106 (1994). Besides forming a monolayer on the metal surface, the above reference reactions produce significant amounts of hydrogen gas as a by-product.

As used herein, the term "hydrogen producing compound" refers to a compound having the formula R—XH and capable of producing hydrogen gas upon reacting with a metal substrate. In one embodiment, X represents a reactive moiety capable of, upon contact with a reactive metal substrate, releasing hydrogen and binding to the metal substrate. Sulfur is a reactive moiety with well-known reactive properties when contacted with reactive metal substrates (see above). In addition to thiol compounds (e.g., compounds containing sulfur as a reactive moiety), compounds having oxygen and selenium are also useful since oxygen, selenium, and sulfur are in the same family in the periodic table and have similar reactive properties. As such, a reactive moiety present in a hydrogen producing compound and suitable for use in the current invention include, for example, sulfur, oxygen, and selenium. Thus, in one embodiment, a hydrogen producing compound is an "organothiol", or a compound having sulfur as a reactive moiety and any organic moiety ("R") as defined herein (see, for example, Example 1).

In another embodiment of the present invention, hydrogen can be produced, upon reacting the hydrogen producing compound with a metal substrate, by dehydrogenation of a hydrocarbon moiety of a hydrogen producing compound. Accordingly, the hydrogen producing compound can further include a hydrocarbon (see below; Example 2).

A hydrogen producing compound further includes an organic moiety ("R"). An organic moiety present in a hydrogen producing compound and suitable for use in the current invention typically comprises a hydrocarbon and can include any organic moiety that maintains the desired phase of the compound during handling (e.g., transportation, transfer, reaction, etc.) and does not substantially interfere with the reaction of the compound with the reactive metal substrate. Suitable R groups include, but are not limited to alkyl, heteroalkyl, lower alkyl, alkenyl, substituted alkenyl, alkynyl, aryl, heteroaryl, alkoxy, cycloalkyl, heterocyclic, alkylaryl, arylalkyl, arylalkenyl, arylalkynyl, arylene, oxyarylene groups, and combinations thereof. R groups can be substituted or non-substituted and can contain one or more heteroatoms.

As used herein, the term "alkyl" refers to a monovalent straight or branched chain hydrocarbon group having from one to about 12 carbon atoms, including methyl, ethyl, n-propyl, isopropyl, n-butyl, isobutyl, tert-butyl, n-hexyl, and the like. For example, by combining alkyl with a hydrogen atom, an alkane can be obtained.

As used herein, the term "heteroalkyl" refers to alkyl groups containing at least one heteroatom. As used herein, the term "heteroatom" refers to N, O, S, and the like.

As used herein, "substituted alkyl" refers to alkyl groups further bearing one or more substituents selected from hydroxy, alkoxy, mercapto, cycloalkyl, substituted cycloalkyl, heterocyclic, substituted heterocyclic, aryl, substituted aryl, heteroaryl, substituted heteroaryl, aryloxy, substituted aryloxy, halogen, cyano, nitro, amino, amido, —C(O)H, acyl, oxyacyl, carboxyl, sulfonyl, sulfonamide, sulfuryl, and the like.

As used herein, "lower alkyl" refers to alkyl groups having from 1 to about 6 carbon atoms.

As used herein, "alkenyl" refers to straight or branched chain hydrocarbyl groups having one or more carbon-carbon double bonds, and having in the range of about 2 up to 12 carbon atoms, and "substituted alkenyl" refers to alkenyl groups further bearing one or more substituents as set forth above.

As used herein, "alkynyl" refers to straight or branched chain hydrocarbyl groups having at least one carbon-carbon triple bond, and having in the range of about 2 up to 12 carbon atoms, and "substituted alkynyl" refers to alkynyl groups further bearing one or more substituents as set forth above.

As used herein, "aryl" refers to aromatic groups having in the range of 6 up to 14 carbon atoms and "substituted aryl" refers to aryl groups further bearing one or more substituents as set forth above.

As used herein, "heteroaryl" refers to aromatic rings containing one or more heteroatoms (e.g., N, O, S, or the like) as part of the ring structure, and having in the range of 3 up to 14 carbon atoms and "substituted heteroaryl" refers to heteroaryl groups further bearing one or more substituents as set forth above.

As used herein, "alkoxy" refers to the moiety —O-alkyl, wherein alkyl is as defined above, and "substituted alkoxy" refers to alkoxyl groups further bearing one or more substituents as set forth above.

As used herein, "cycloalkyl" refers to ring-containing alkyl groups containing in the range of about 3 up to 8 carbon atoms, and "substituted cycloalkyl" refers to cycloalkyl groups further bearing one or more substituents as set forth above.

As used herein, "heterocyclic", when not used with reference to an aromatic ring, refers to cyclic (i.e., ring-containing) groups containing one or more heteroatoms (e.g., N, O, S, or the like) as part of the ring structure, and having in the range of 3 up to 14 carbon atoms and "substituted heterocyclic" refers to heterocyclic groups further bearing one or more substituents as set forth above.

As used herein, "alkylaryl" refers to alkyl-substituted aryl groups and "substituted alkylaryl" refers to alkylaryl groups further bearing one or more substituents as set forth above.

As used herein, "arylalkyl" refers to aryl-substituted alkyl groups and "substituted arylalkyl" refers to arylalkyl groups further bearing one or more substituents as set forth above.

As used herein, "arylalkenyl" refers to aryl-substituted alkenyl groups and "substituted arylalkenyl" refers to arylalkenyl groups further bearing one or more substituents as set forth above.

As used herein, "arylalkynyl" refers to aryl-substituted alkynyl groups and "substituted arylalkynyl" refers to arylalkynyl groups further bearing one or more substituents as set forth above.

As used herein, "arylene" refers to divalent aromatic groups having in the range of 6 up to 14 carbon atoms and "substituted arylene" refers to arylene groups further bearing one or more substituents as set forth above.

As used herein, "oxyarylene" refers to the moiety "O-arylene", wherein arylene is as defined above and "substituted oxyarylene" refers to oxyarylene groups further bearing one or more substituents as set forth above.

Figure 5:
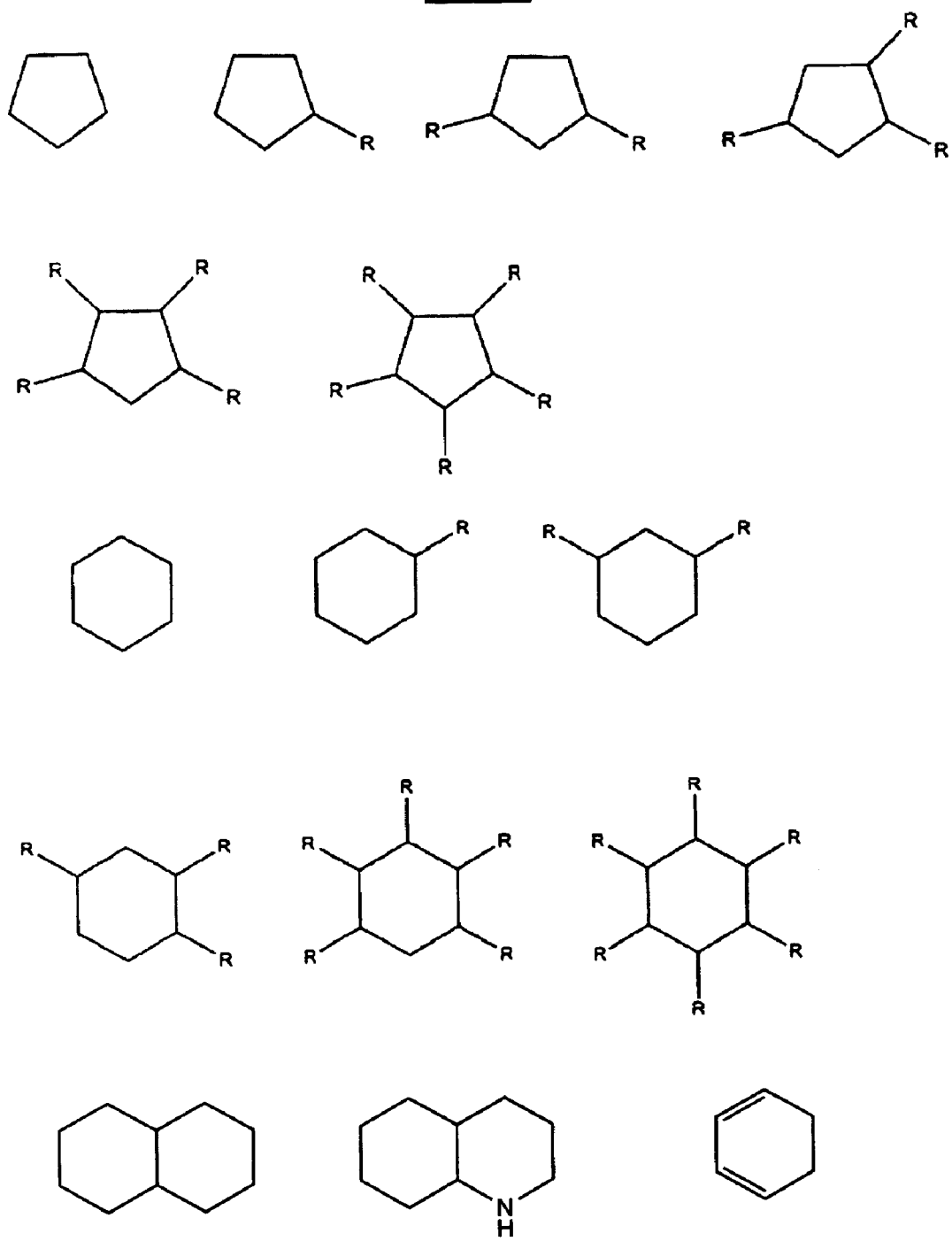
FIG. 5 further illustrates exemplary compounds suitable for use according to the present invention.

Various examples of hydrogen producing compounds suitable for use in the current invention are provided, and are not intended to be limited to any particular size hydrocarbon. For example, hydrogen producing compounds can include molecules having relatively large hydrocarbon groups, such as 6 or more carbons (e.g., $C_6$–$C_{12}$, $C_{12}$–$C_{20}$, or greater than 20 carbons) molecules having relatively little hydrocarbon (e.g., less then six carbons). Examples includes methyl mercaptan ($CH_3SH$), as well as organothiols having the formula $CH_3(CH_2)_nSH$, where n=less than six (e.g., 2, 3, 4, or 5). Examples also include organothiols having multiple thiol groups. Compounds having multiple thiol groups typically less than four thiol groups per molecule (e.g., 2 or 3). Molecules having a high ratio of —XH groups (e.g., thiols), form polymers through —X—X— bonds, the low viscosity of which can decrease the usefulness of the compound for the purposes of the present invention. Examples of compounds having multiple —XH groups include HS—$(CH_2)_n$—SH, where n=less than 6 (e.g., 2–3), as well as heteroatom compounds such as dithiothreitol. Other examples of compounds suitable for use in the current invention include HO—$CH_2$—$CH_2$—SH, thiobenzene, and thiophenol. Further examples of compounds suitable for use according to the present invention are illustrated in FIGS. 4 and 5.

In one embodiment, the hydrogen producing compound of the invention is present, at room temperature, in the form of a liquid. Such a liquid state at room temperature is useful, for example, where utilization of current automobile fuel dispensing methods (e.g., gas pump) is desired. As such, hydrogen producing compounds useful in the current invention are typically in the liquid phase at room temperature and have a boiling point range of about 20° C. to about 200° C.

The step of reacting a hydrogen producing compound with a reactive metal substrate is exemplified below, in terms of reacting an organothiol with a gold substrate to produce hydrogen gas and an organothiolate bound to the gold substrate, as follows:

Example: 

A reactive metal substrate useful in the present invention includes any substrate containing a metal and capable of reacting with a hydrogen producing compound to provide a spent compound or compound bound to the substrate that is dehydrogenated as compared to the unreacted hydrogen producing compound. Suitable reactive metal substrates can include, for example, gold, silver, platinum, copper, and mercury. Metal substrates can further include, for example, metals treated to remove a surface oxide coating, thereby enhancing the reactive capacity of the metal substrate when contacted with a hydrogen producing compound as described herein. Useful metal substrates are not limited to a particular size or range of sizes. The choice of an appropriate metal substrate size for a given application will be apparent to those of skill in the art. Reactive metal substrates useful in the current invention are not limited with respect to form and can include, for example, a film, sheet, foil, wire, wafer, tube, fiber, rod, sphere, and any combination or plurality thereof. A reactive metal substrate can also be in a form designed to enhance or maximize the surface area of the metal substrate. A reactive metal substrate with a enhanced surface area can include, for example, various forms of nanoporous metals (e.g., nanoporous gold), such as described in U.S. Pat. No. 6,805,972, which is incorporated herein by reference (see also, U.S. Pat. No. 4,977,038).

In one embodiment of the present invention, where reacting the hydrogen producing compound produces hydrogen gas and a compound bound to the substrate, the invention further includes disassociating the bound compound (e.g., organothiolate compound) from the metal substrate to produce an unbound spent compound. As used herein, the term "spent compound" refers to an unbound compound that has been reacted with a metal substrate to produce hydrogen and is dehydrogenated as compared to the hydrogen producing compound prior to reacting with the metal substrate. Thus a spent compound can include a compound that has been reacted with a metal substrate and further disassociated from the metal substrate. In some embodiments, spent compound is produced in the absence of a disassociating step (see below). A spent compound can include, for example, a dimeric compound having the formula R—X—X—R, produced by disassociating the R—X bound from the metal substrate. In one embodiment, a spent compound includes a polymeric compound formed from a combination of multiple (e.g., at least two) R—X compounds disassociated from the metal substrate.

The process of disassociating the R—X compound from the metal substrate, and thereby producing a spent compound, is exemplified in terms of disassociating an organothiolate compound from a gold substrate to form a disulfide molecule as follows:

Example: Au(—S—R)$_2$—→R—S—S—R+Au

It will be recognized, however, that a compound produced by the disassociation step can include compound other than a combination of multiple "—X—R" compounds (e.g., polymeric compound) that are disassociated from the metal substrate. In some cases, for example, where a initial hydrogen producing compound comprises a plurality of reactive moieties (e.g., HS(CH$_2$)$_n$SH), a spent compound can be formed by bonding of two reactive moieties within a single compound, as illustrated below:

Various methods of disassociating the R—X compound from the metal substrate are suitable for use in the methods of the invention, including, for example, by application of an energy source. In one example, R—X compound can be disassociated from the metal substrate by the application of heat. R—X compound can be disassociated from the metal substrate for example, at a heat of greater than 80° C. The applied heat can include, for example, applying a heat source of about 50–100° C., such as 60–80° C., and more specifically, about 70° C. Other methods can include application of ultraviolet (UV) light, or application of an electrical current. Surface interactions between a bound compound and a metal substrate range according to the present invention, typically range from about 10 kJ/mol to about 50 kJ/mol. The thiolate-gold interaction, for example, has an interaction energy of about 35 kJ/mol. Thus, more energy than 35 kJ must be added to the surface to liberate/disassociate the bound compound. The particular amount of energy required for disassociating compound bound to the metal substrate will depend, in part, on the combination of compound and metal being utilized and will be readily determinable by the skilled artisan. For further discussion of dissociating metal substrate bound R—X compound, such as temperature-driven release of organothiolate compounds from metal substrates, see, for example, Walczak et. al., Langmuir 1991, 7, 2687–2693; Bondzie et. al., Surface Science 431 (1999) 174–185; Rowe et. al., Langmuir 1991, 7, 2307–2312; Ross et. al., Langmuir 1993, 9, 632–636; Huang et. al., 1993, J. Am. Chem. Soc. 115, 3342–3343; all of which are incorporated herein by reference.

The present invention further includes regenerating hydrogen producing compound from spent compound. Regenerating hydrogen producing compound from spent compound includes, for example, reacting a spent compound with hydrogen to produce a compound having a formula R—XH, thereby regenerating hydrogen producing compound from the spent compound. Various methods by which a spent compound, such as a dimeric compound, can be chemically reduced are known in the art. Where the dimeric compound is a disulfide, for example, the disulfide can be reduced with hydrogen to form a thiol, thereby regenerating the hydrogen-rich thiol. For example, the disulfide can be reacted with hydrogen to form a thiol by catalytic hydrogenation (e.g., reaction with a rhodium carbonyl catalyst). Various methods for the catalytic hydrogenation of organothiols, for example, will be readily apparent to those skilled in the art (see, for example, U.S. Pat. No. 4,767,884; Bondzie et. al., Surface Science 431 (1999) 174–185). The hydrogen used for regenerating the spent compound can be produced by any method known in the art (e.g., electrolytic dissociation of water, reforming of hydrocarbons, high pressure storage, etc.). Where the inventive devices and methods are performed, for example, on board a hydrogen powered vehicle, the regeneration of spent compound to a form suitable for hydrogen production can occur at a location separate from the hydrogen production, such as "off-board" the vehicle, where limitations of existing methods such as high temperatures and pressures (e.g., reforming) are of less importance.

Regeneration of a hydrogen producing compound from a spent compound is exemplified below. A dimeric disulfide compound, for example, can be reduced with hydrogen to a thiol to regenerate the hydrogen-rich thiol. For example, a disulfide can be converted to thiol by catalytic hydrogenation, as exemplified in the two reactions illustrated below:

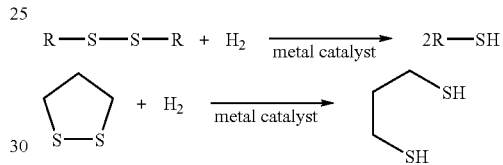

According to the methods of the present invention, hydrogen can also be produced by dehydrogenation of a hydrocarbon moiety of a hydrogen producing compound, wherein the dehydrogenation occurs upon reacting the compound with a metal substrate. Thus, in another embodiment of the present invention, a method of storing and producing hydrogen for use in generating energy includes reacting a liquid compound capable of producing hydrogen and having a formula of R$_1$—XH, with a metal substrate to produce hydrogen gas and a spent compound. A spent compound can include, for example, a compound having a formula R$_2$—XH, wherein R$_2$ is dehydrogenated relative to R$_1$; R$_3$=X, wherein R$_3$ is dehydrogenated relative to R$_1$; or a combination thereof. Suitable R groups are as defined above.

Although the outcome of hydrogen production by dehydrogenation of a hydrocarbon moiety of a hydrogen producing compound, according to the present invention, is catalytic dehydrogenation the principle is the same as catalytic hydrogenation. The difference is that the hydrogen source for this process of hydrogen production by hydrocarbon dehydrogenation is potentially any organic molecule that contains hydrogen. In normal catalytic hydrogenation the catalyst surface breaks the bond between hydrogen molecule homolytically (H—H 436 kJ/mole) and the catalyst forms a new bond with hydrogen. Because these new bonds lack stability, some of the hydrogen atom can leave the surface as hydrogen gas. According to the current method of hydrogen production, a hydrocarbon moiety (e.g., R as defined above) of the hydrogen producing compound is the source of hydrogen. This hydrocarbon moiety is passed over the catalyst and the catalyst surface abstracts hydrogen from the hydrocarbon moiety and forms a bond with it as before. An examination of some of the bond energies for hydrocarbon moieties (e.g., CH$_3$—H 440 kJ/mole; CH$_3$CH$_2$—H 421 kJ/mole; CH$_3$CH$_2$CH$_2$—H 423 kJ/mole; CH$_2$=CH$_2$ $CH_2$—H 375 kJ/mole; $(CH_3)_3C$—H 359 kJ/mole; $CH_2$=CH—H 465 kJ/mole; RS—H 367 kJ/mole) and a comparison of their bond energies with the bond energy of hydrogen (H—H 436 kJ/mole) suggests that any of these molecules are capable of losing hydrogen atom to the catalyst. However, it is easier for those that can generate a more stable molecule after losing hydrogen (e.g. propylene and 2-methylpropane). In one example, a cyclohexyl moiety can be selected because it can lose three moles of hydrogen to form a very stable aromatic structure. Converting the aromatic group to cyclohexyl moiety is a known process (see, for example, U.S. Pat. No. 5,189,233; and Makal et al., Catalytic Hydrogenation of Benzene to Cyclohexane in Gas Phase, Pol. (1989) PL 146758). Furthermore, since the first step of the process is initiated by homolytic cleavage, in theory, any atom that can produce a stable radical is suitable for the above reaction. Hydrocarbon molecules can also be effective for hydrogen production (FIG. 5).

Exemplary compounds suitable for storage and production of hydrogen by dehydrogenation of hydrocarbon moiety include, for example, butanethiol, pentanethiol, hexanethiol; cyclohexanethiol, and 1,4-cyclohexandithiol. Other examples of compounds suitable for hydrogen generation by dehydrogenation of a hydrocarbon moiety include the following compounds illustrated in FIGS. 4 and 5.

The compound 1,4-cyclohexandithiol and gold are used to exemplify production of hydrogen by hydrogenation of a hydrocarbon moiety of a hydrogen producing compound, according to the present invention. As illustrated below, when 1,4-cyclohexandithiol contacts the gold surface, hydrogen is instantly released and the 1,4-cyclohexandithiol is converted to spent compounds dithioparabenzoquinone and/or 1,4-benzenedithiol plus hydrogen.

EXAMPLE

The spent compounds dithioparabenzoquinone and/or 1,4-benzenedithiol are separated from hydrogen, for example, by any of the various methods known in the art for separating hydrogen from a liquid, such as by the large difference in their boiling points or by membrane separation methods.

The spent compounds produced by the dehydrogenation reaction are capable of being re-hydrogenated, thereby regenerating the spent compound to a form suitable for re-use in hydrogen production. According to the below example, the dithioparabenzoquinone and 1,4-benzenedithiol can be chemically reduced to 1,4-cyclohexandithiol. In this process, the molecule is re-hydrogenated or "recharged" with hydrogen and can again be utilized for producing hydrogen that can be used, for example, for generating energy. Various methods by which the hydrocarbon moiety of spent compounds such as dithioparabenzoquinone and 1,4-benzenedithiol molecules can be chemically reduced are known in the art and include, for example catalytic hydrogenation. For further discussion of hydrocarbon hydrogenation, such as catalytic hydrogenation see, for example, Botaiux et al., "Newest Hydrogenation Catalysts", Hydrocarb. Process, March 1985, p. 51–59; and U.S. Pat. No. 6,794,552; all of which are incorporated herein by reference.

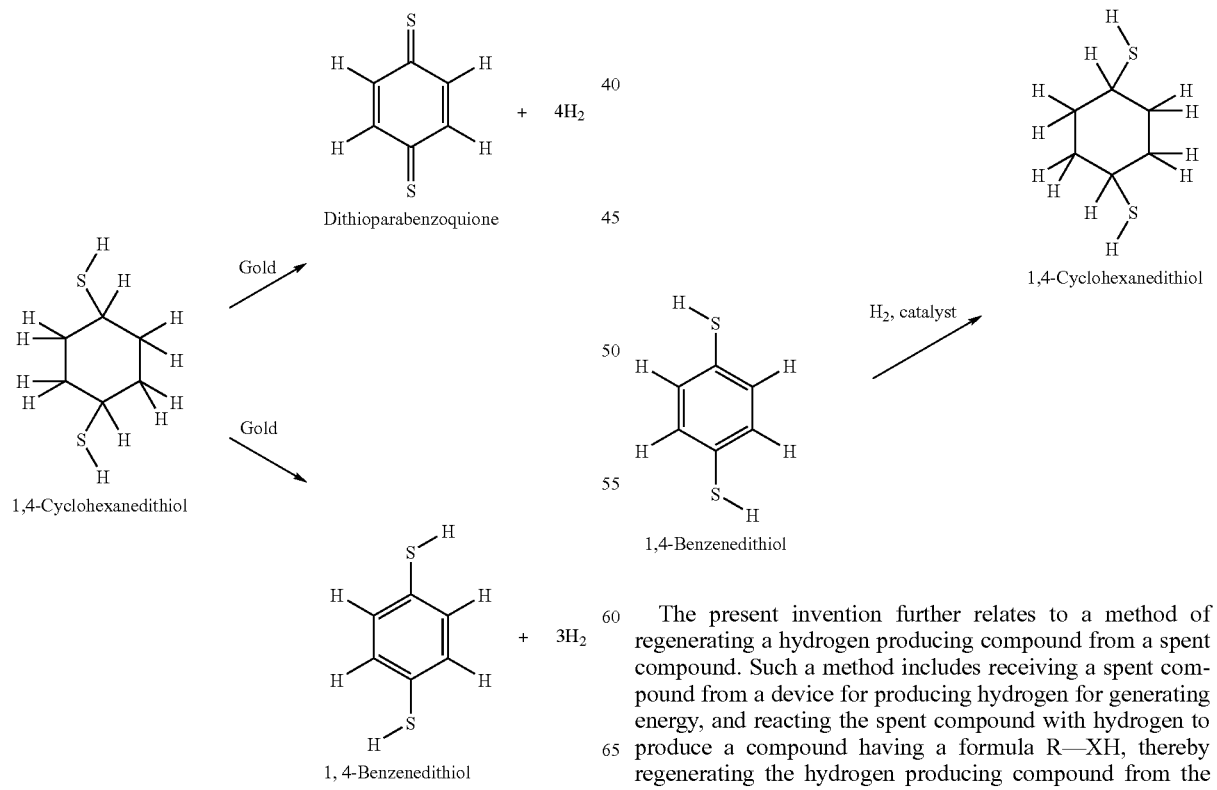

The present invention further relates to a method of regenerating a hydrogen producing compound from a spent compound. Such a method includes receiving a spent compound from a device for producing hydrogen for generating energy, and reacting the spent compound with hydrogen to produce a compound having a formula R—XH, thereby regenerating the hydrogen producing compound from the spent compound.

The steps of producing hydrogen for generating energy and the step of regenerating the hydrogen producing compound from the spent compound can occur at the same location or locations of close proximity. Alternatively, the hydrogen production step and the spent compound regeneration step can occur at different locations. For example, the hydrogen production step can occur in or on-board an automobile, whereas the spent compound regeneration step can occur off-board or separate from the automobile, including, for example, following removal of the spent compound from the automobile. In one example, regeneration of spent compound can occur at a service station, analogous to service stations (e.g., gas stations, truck stops, etc.) that are currently utilized. Where the hydrogen production occurs at a stationary unit, such as a building (e.g., home, business, dwelling, etc.), the regeneration can also occur at the building, such as a location within the building and in close proximity to the location within the building of hydrogen production, or can occur at a location different than the building.

The present invention further relates to a device for producing hydrogen for generating energy. A device of the invention includes a storage reservoir adapted to contain a hydrogen producing compound having a formula R—XH, where R is an organic moiety and X is a reactive moiety selected from the group of sulfur, oxygen, and selenium. The device further includes a metal substrate adapted to react the hydrogen producing compound to produce hydrogen gas and spent compound and/or an R—X compound bound to the metal substrate.

In an embodiment where the reaction of hydrogen producing compound with the metal substrate produces compound bound to the metal substrate, the device can additionally include an energy source capable of disassociating the bound compound from the metal substrate to produce an unbound spent compound (e.g., a dimeric compound having a formula R—X—X—R). The energy source can include, for example, a heat source or a UV light source. Where the device is present on an automobile, for example, the heat source can include heat derived from a hydrogen consuming device, such as a hydrogen combustion engine. In another embodiment, the metal substrate can be adapted for removal from the device. In such an embodiment, complex comprising metal substrate and bound compound can be removed from the device and exposed to energy from an energy source in order to disassociate bound compound from the metal substrate.

The device can also include a reservoir for storing the spent compound. In one embodiment, the reservoir for storing the spent compound is adapted for removal of the spent compound from the device. The device can additionally include a regeneration chamber adapted to react the spent compound with hydrogen received from a source external to the device to produce a compound having a formula R—XH, thereby regenerating the spent compound to a form suitable for hydrogen production. The device of the invention is amenable to utilizing the hydrogen gas to generate energy. Utilizing the hydrogen gas to generate energy can include, for example, consuming the hydrogen gas in a hydrogen combustion engine or in a fuel cell.

Figure 2:
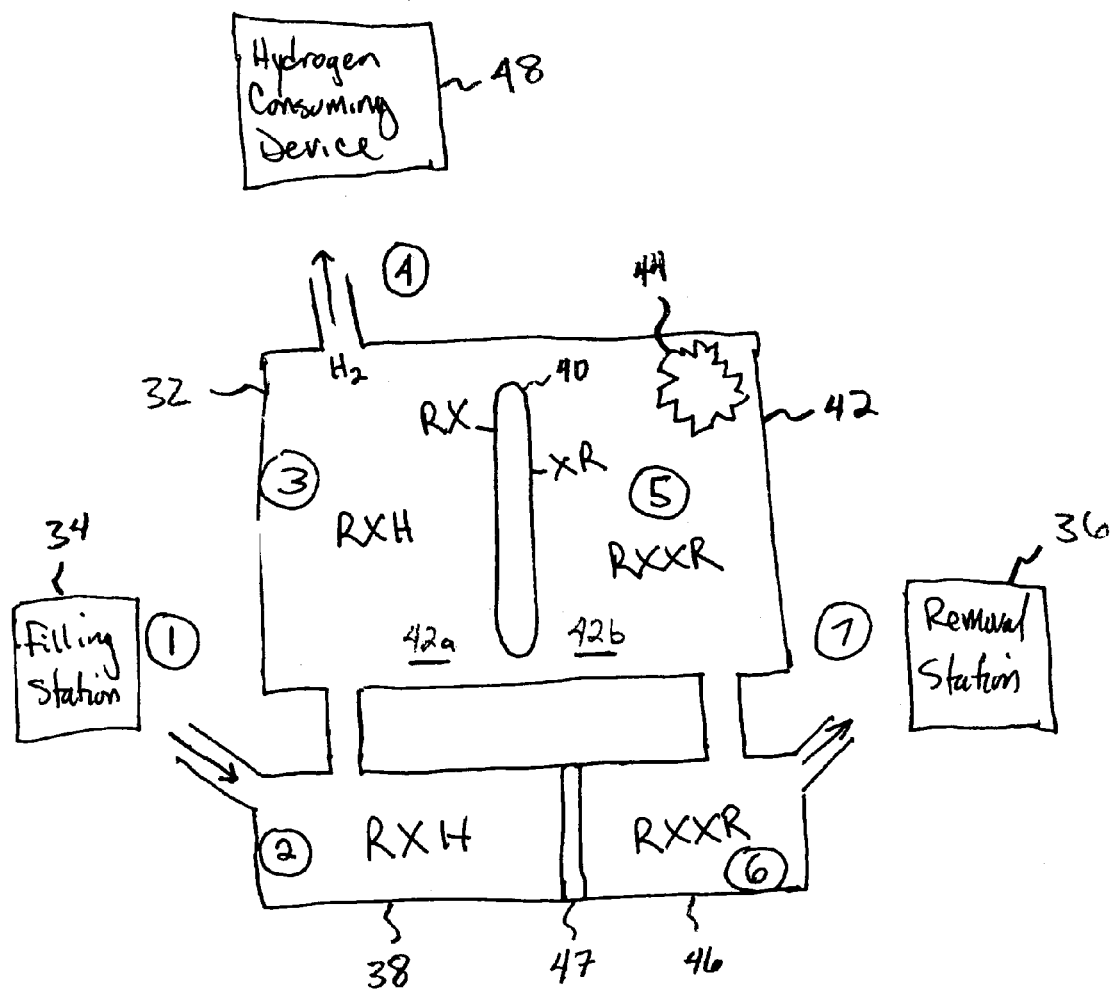
FIG. 2 illustrates a hydrogen production and regeneration system utilizing a device according to an embodiment of the invention.

FIG. 2 illustrates a hydrogen production and regeneration system 30 and device 32 according to an embodiment of the invention. The illustrated system includes a filling station 34, a device 32 for producing hydrogen for generating energy, and a removal station 36. The device 32 includes a storage reservoir 38 adapted to contain a hydrogen producing compound having a formula R—XH, wherein R is an organic moiety and X is selected from sulfur, oxygen, and selenium. The device 32 further includes a reactive metal substrate 40 adapted to react the compound to produce spent compound and/or R—X compound bound to the metal substrate 40, and hydrogen gas. In the exemplified embodiment, the device includes a reaction chamber 42 containing the metal substrate 40 and an energy source 44 for disassociated the R—X compound bound to the metal substrate 40 to produce an unbound spent compound (e.g., dimeric compound having a formula R—X—X—R). The device 32 further includes a reservoir 46 for storing spent compound, which can be adapted for removal of the spent compound from the device. The reservoir 46 and storage reservoir can be separate or formed as one continuous unit that is partitioned, for example, by a barrier 47. In one embodiment, the barrier 47 can be a moveable barrier, in which the position of the moveable barrier defines the volumes of reservoirs 38 and 46. The position of the barrier is influenced, for example, by the addition or removal and, therefore, the relative amounts of hydrogen producing compound and spent compound in reservoirs 38 and 46, respectively. For example, where the barrier 47 is a moveable barrier, filling of the reservoir 38 with hydrogen producing compound can cause movement of the barrier 47, thereby causing an expansion of the volume of reservoir 38 and a corresponding contraction in the volume of reservoir 46. The system can further include a hydrogen consuming device 48 adapted to accept hydrogen from the device 32 of the invention.

Operation of a system and device of the invention is discussed with reference to FIG. 2. Hydrogen producing compound (e.g., liquid organothiol) is transferred from a filling station 34 to the device 32 (See FIG. 2, step 1). Compound (R—XH in FIG. 2) is typically in liquid form and can be stored in the storage reservoir 38 (See FIG. 2, step 2). Upon demand, the compound can be reacted with a reactive metal substrate 40 to produce hydrogen gas ($H_2$ in FIG. 2) and spent compound and/or R—X compound bound to the metal substrate 40 (See FIG. 2, step 3). The hydrogen produced from the reacting step can be directed to a hydrogen consuming device 48, such as a fuel cell or a hydrogen combustion engine (See FIG. 2, step 4). The R—X compound bound to the metal substrate 40 can be disassociated from the metal substrate 40 by application of energy from an energy source 44 to produce a spent compound, such as a dimeric compound having a formula R—X—X—R (See FIG. 2, step 5). Following the disassociation step, spent compound can be collected, for example, after condensation and formation of a liquid, in a reservoir 46 for storing spent compound (See FIG. 2, step 6). Spent compound can then be removed from the reservoir 46 at a removal station 36 (See FIG. 2, step 7) and subsequently regenerated to a form suitable for hydrogen production (e.g., hydrogen producing compound).

Accordingly, the present invention also relates to an assembly for producing and utilizing hydrogen. In one embodiment, the assembly includes a first unit for generating hydrogen and a second unit for utilizing hydrogen to generate energy, wherein the second unit is adapted to accept hydrogen from the first unit. The first unit includes a storage reservoir adapted to contain a hydrogen producing compound having a formula R—XH, wherein R is an organic moiety (see above) and X is selected from the group of sulfur, oxygen, and selenium; and a metal substrate adapted to react with the hydrogen producing compound to produce hydrogen gas and spent compound and/or an R—X compound bound to the metal substrate. The second unit can include a hydrogen consuming device, such as a hydrogen combustion engine or a fuel cell. An assembly of the invention can be contained, for example, within an vehicle or automobile. An assembly of the invention can additionally include an energy source capable of disassociating R—X from the metal substrate to produce a spent (e.g., a dimeric compound having a formula R—X—X—R). The energy source can include, for example, a heat source or a UV light source.

The assembly can also include a reservoir for storing the spent compound. In one embodiment, the reservoir for storing the spent compound is adapted for removal of the spent compound from the device. The assembly can additionally include a regeneration chamber adapted to react the spent compound with hydrogen received from a source external to the device to produce a compound having a formula R—XH, thereby regenerating the spent compound to a form suitable for hydrogen production.

Figure 3:
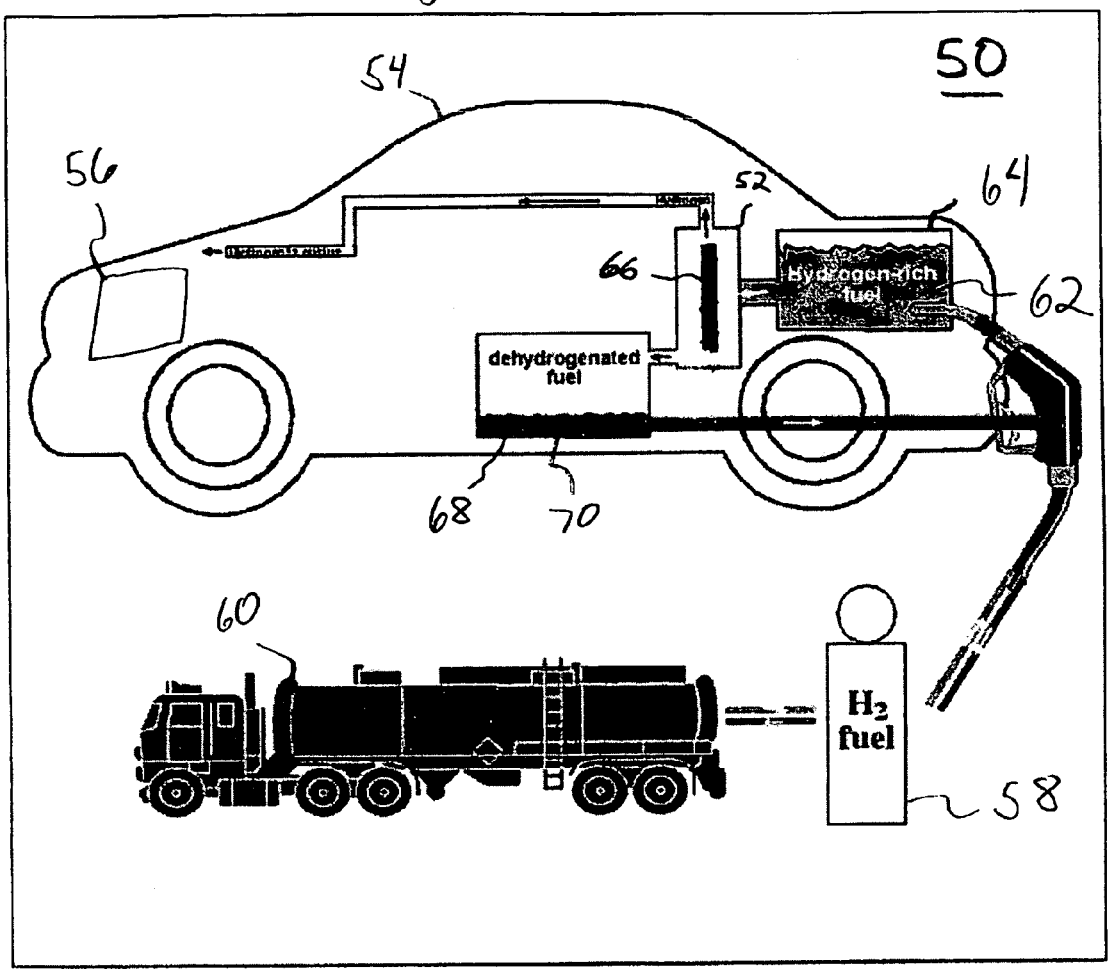
FIG. 3 illustrates system and device according to an embodiment of the invention.

FIG. 3 further illustrates system 50 and device 52 according to an embodiment of the invention. A device 52 of the invention can be located, for example, within a vehicle 54 that is being powered by a hydrogen consuming device 56. Thus, the illustrated system 50 includes a vehicle 54 having the device 52 for producing hydrogen for generating energy, service station 58, and a transportation means 60. A hydrogen producing compound 62 (e.g., liquid organothiol) is transferred from the service station 58 to a storage reservoir 64 of the device 52 located within the vehicle 54. The compound 62 can be reacted with a metal substrate 66, upon demand, to produce hydrogen gas and spent compound and/or R—X compound (e.g., organothiolate) bound to the metal substrate 66. The hydrogen gas can be delivered to the hydrogen consuming device 56 for generating energy utilized in the operation of the vehicle 54. The R—X compound bound to the metal substrate 66 can be disassociated from the metal substrate 66 by application of energy from and energy source to produce a spent compound (e.g., dimeric compound, R—X—X—R). The spent compound 68 can be stored in a reservoir 70 and ultimately removed from the vehicle 54 and located, for example, at the service station 58. The spent compound 68 can be regenerated to a form suitable for hydrogen production. Regeneration can occur at the service station 58 or at another location. Hydrogen producing compound and/or spent compound can be transported to and from the service station by the transportation means 60. A transportation means suitable for use in the current invention can include any means of transferring a liquid from one location to another, including, for example, conventional vehicle transportation means (e.g., truck, tanker, ship, etc) as well as by pipeline or other method.

Example 1

Hydrogen Production Following Reaction of an Organothiol with a Metal Substrate

The following example illustrates collection and quantification of hydrogen gas produced by reacting organothiol compounds with a metal substrate. The exemplified reactions were conducted by providing a vessel for conducting the hydrogen producing reactions, the vessel including a chamber, an inlet and an outlet. Reactions were conducted by placing reaction materials in the chamber of the vessel, reacting the materials, and measuring the hydrogen produced by the reaction. Materials were introduced into the vessel via the inlet and hydrogen produced by the reaction was removed from the vessel via the outlet. Hydrogen was analyzed and quantitated by gas chromatography, including by a gas chromatograph connected to a reductive gas analyzer ("GC-RGA") (Reduction Gas Analyzer Trace Analytical, In,. Model TA 3000).

A positive control experiment was first conducted in order to demonstrate that the testing apparatus could detect hydrogen gas produced by reacting materials in the vessel. For a positive control, a small amount of sodium (10–20 mg) was placed in the chamber of a vessel, where the volume of the chamber was approximately 25 ml. The vessel was then sealed and the chamber evacuated by vacuum pump. Water (20 µl) was further introduced into the flask and reacted with the sodium present in the chamber. The reaction between the sodium and the water produced large quantities of hydrogen gas, which filled the flask. Analysis of the contents of the vessel chamber by GC-RGA following the reaction showed that about 10000 ppm hydrogen gas were present in the chamber of the flask.

An experiment, similar to the positive control above, was performed using an organothiol and a metal substrate. Hexanethiol (99%) was purchased from Aldrich chemical company. Gold powder, spherical, APS 5.5–9.0 micron, 99.96% (metal basis), S.A. 0.05–0.2 m$^2$/g was purchased from Alfa Aesar. Gold powder (300 mg) was placed in the chamber of the vessel (about 5 ml in volume). Following sealing of the vessel and evacuation of the chamber by vacuum pump, hexanethiol (1 ml) was introduced into the chamber of the vessel. Following the reaction, the contents of the vessel were analyzed with by GC-RGA. Hydrogen gas was detected in the vessel, following the reaction, in quantities of approximately 3000 ppm.

The experiment was repeated, as described above, with gold powder (300 mg) placed in the chamber of the vessel and 2% hexanethiol in ethanol (1 ml) injected into the chamber following vacuum pump evacuation. Hydrogen gas content, following the reaction, was determined by GC-RGA at approximately 2000 ppm. Furthermore, room air was analyzed in order to determine hydrogen gas content and retention time. Experimental results for hydrogen gas content of room air, positive control, pure hexanethiol and 2% hexanethiol in ethanol are shown in Table 1.

TABLE 1

| Sample | Hydrogen in ppm |
|---|---|
| Room Air | 500 |
| Positive control | 10000 |
| Pure Hexanethiol | 3000 |
| 2% Hexanethiol in ethanol | 2000 |

The above experiments where further repeated as described above, but hydrogen gas analysis and quantification was performed using gas chromatography connected to mass spectrometry ("GC-MS") (Agilent GC/MS model 6890N/5973). Analysis by GC-MS confirmed the results of the experiments with analysis by GC-RGA, showing production of hydrogen by reacting organothiol compounds with the metal substrates. Although the instrument could not show the hydrogen peak, a negative peak below the retention time of the room air was determined. This negative peak could have been due to the lack of background gas (e.g., He) and possibly the presence of another gas, which has a lower retention time than air. This was interpreted as hydrogen, since it gave a similar result with positive control.

Example 2

Hydrogen Production Following Reaction of a Hydrocarbon with a Metal Substrate The following example illustrates production and collection of hydrogen following a reaction of a hydrocarbon with a gold metal catalyst, causing dehydrogenation of the hydrocarbon and release of hydrogen gas.

In the present example, an injector port of a GC/MS was packed with gold powder and heated to 175° C. Following pacing and heating of the gold, 1 µl of cyclohexanol (99% Aldrich) was injected through the injector port. The effluent was monitored directly by GC/MS (see above). Reaction of the cyclohexanol with the gold and monitoring by GC/MS showed a negative peak with a retention time similar to that of the room air. The results indicate a lack of helium in the detector or presence of another gas, which was interpreted as hydrogen gas produced by the reaction. Furthermore, the major hydrocarbon compound detected following the reaction was phenol (i.e., dehydrogenated cyclohexanol). No cyclohexanol was detected following the reaction.

As a control, a similar experiment was done without the gold packing step. No negative peak or phenol was detected in the control experiment. The only compound detected was cyclohexanol, indicating that no reaction occurred in the absence of the gold metal substrate.

Although the invention has been described with reference to the examples described herein, it will be understood that modifications and variations are encompassed within the spirit and scope of the invention. Accordingly, the invention is limited only by the following claims.

What is claimed is:

1. A method of storing and producing hydrogen for use in generating energy, comprising:
   reacting a liquid compound capable of producing hydrogen and having a formula $R_1$—XH, with a metal substrate to produce hydrogen gas and $R_1$—X bound to the metal substrate; and
   collecting the hydrogen gas;
   wherein $R_1$ is a moiety selected from the group consisting of an alkyl, heteroalkyl, alkenyl, substituted alkenyl, alkynyl, aryl, heteroaryl, alkoxy, cycloalkyl, heterocyclic, alkylaryl, arylalkyl, arylalkenyl, arylalkynyl, arylene, oxyarylene group, and combinations thereof;
   and X is selected from the group consisting of sulfur, oxygen, and selenium.

2. The method of claim 1, wherein the metal substrate comprises a metal selected from the group consisting of gold, silver, platinum, copper, and mercury.

3. The method of claim 1, wherein the metal substrate comprises a metal treated to remove a surface oxide coating.

4. The method of claim 1, wherein the liquid compound is a $C_2$–$C_8$ organothiol.

5. The method of claim 1, further comprising disassociating the $R_1$—X bound to the metal substrate to produce a spent compound.

6. The method of claim 5, wherein the spent compound is a dimeric compound having a formula $R_1$—X—X—$R_1$.

7. The method of claim 5, wherein the disassociating comprises heating the $R_1$—X bound to the metal substrate.

8. The method of claim 5, wherein the disassociating comprises contacting the $R_1$—X bound to the metal substratea with ultraviolet (UV) light.

9. The method of claim 5, further comprising reacting the spent compound with hydrogen to produce a compound having a formula $R_1$—XH, thereby regenerating the compound capable of producing hydrogen from the spent compound.

10. The method of claim 9, wherein reacting the spent compound with hydrogen comprises catalytic hydrogenation.

11. The method of claim 9, wherein the producing hydrogen and the regenerating the spent compound occur at different locations.

12. The method of claim 1, further comprising:
    reacting the liquid compound with the metal substrate to produce hydrogen gas and a spent compound comprising: (a) $R_2$—XH, wherein $R_2$ is dehydrogenated relative to $R_1$; (b) $R_3$=X, wherein $R_3$ is dehydrogenated relative to $R_1$; or (c) a combination of (a) and (b);
    wherein each of $R_1$, $R_2$, and $R_3$ is a moiety independently selected from the group consisting of an alkyl, heteroalkyl, alkenyl, substituted alkenyl, alkynyl, aryl, heteroaryl, alkoxy, cycloalkyl, heterocyclic, alkylaryl, arylalkyl, arylalkenyl, arylalkynyl, arylene, and oxyarylene group;

13. The method of claim 1, wherein the collecting comprises consuming the hydrogen gas in a combustible engine or fuel cell.

14. A method of storing and producing hydrogen for use in generating energy, comprising:
    reacting a liquid compound capable of producing hydrogen and having a formula $R_1$—XH, with a metal substrate to produce hydrogen gas and a spent compound comprising:
    (a) $R_2$—XH, wherein $R_2$ is dehydrogenated relative to $R_1$;
    (b) $R_3$=X, wherein $R_3$ is dehydrogenated relative to $R_1$; or
    (c) a combination of (a) and (b); and
    collecting the hydrogen gas;
    wherein each of $R_1$, $R_2$, and $R_3$ is a moiety independently selected from the group consisting of an alkyl, heteroalkyl, alkenyl, substituted alkenyl, alkynyl, aryl, heteroaryl, alkoxy, cycloalkyl, heterocyclic, alkylaryl, arylalkyl, arylalkenyl, arylalkynyl, arylene, oxyarylene group, and combinations thereof wherein X is selected from the group consisting of sulfur, oxygen, and selenium; and
    reacting the spent compound with hydrogen to produce a compound having a formula $R_1$—XH, thereby regenerating the compound capable of producing hydrogen from the spent compound.

15. The method of claim 14, wherein the metal substrate comprises gold, silver, platinum, copper, or mercury.

16. The method of claim 14, wherein the metal substrate comprises a metal treated to remove a surface oxide coating.

17. The method of claim 14, wherein reacting the spent compound with hydrogen comprises catalytic hydrogenation.

18. The method of claim 14, wherein the producing hydrogen and the regenerating the spent compound occur at different locations.

19. A method of storing and producing hydrogen for use in generating energy, comprising:
    reacting a liquid compound capable of producing hydrogen and having a formula $R_1$—XH, with a metal substrate to produce hydrogen gas and $R_1$—X bound to the metal substrate and a spent compound comprising:
    (a) $R_2$—XH, wherein $R_2$ is dehydrogenated relative to $R_1$;

(b) $R_3$=X, wherein $R_3$ is dehydrogenated relative to $R_1$; or (c) a combination of (a) and (b); and collecting the hydrogen gas;

wherein each of $R_1$, $R_2$, and $R_3$ is a moiety independently selected from the group consisting of an alkyl, heteroalkyl, alkenyl, substituted alkenyl, alkynyl, aryl, heteroaryl, alkoxy, cycloalkyl, heterocyclic, alkylaryl, arylalkyl, arylalkenyl, arylalkynyl, arylene, oxyarylene group, and combinations thereof wherein X is selected from the group consisting of sulfur, oxygen, and selenium.

20. The method of claim 19, further comprising reacting the $R_2$—XH compound with the metal substrate to produce hydrogen gas and $R_2$—X bound to the metal substrate.

21. The method of claim 20, further comprising disassociating the $R_1$—X— bound to the metal substrate or the $R_2$—X— bound to the metal substrate to produce a spent compound comprising $R_1$—X— or $R_2$—X— disassociated from the metal substrate.

22. The method of claim 21, wherein the spent compound comprising $R_1$—X— or $R_2$—X— is selected from the group consisting of $R_1$—X—X—$R_1$, $R_2$—X—X—$R_2$, and $R_1$—X—X—$R_2$.

23. The method of claim 14, wherein the collecting comprises consuming the hydrogen gas in a combustible engine or fuel cell.

* * * * *